(12) United States Patent
Diedrich et al.

(10) Patent No.: US 7,555,316 B2
(45) Date of Patent: Jun. 30, 2009

(54) SYSTEM AND METHOD FOR FORMATTING AND DISPLAYING NUMBERS

(75) Inventors: Nathaniel W. Diedrich, Dublin, OH (US); Ross C. Miller, Hilliard, OH (US)

(73) Assignee: Honda Motor Co., Ltd., Tokyo (JP)

( * ) Notice: Subject to any disclaimer, the term of this patent is extended or adjusted under 35 U.S.C. 154(b) by 698 days.

(21) Appl. No.: 10/668,170

(22) Filed: Sep. 24, 2003

(65) Prior Publication Data

US 2005/0064910 A1    Mar. 24, 2005

(51) Int. Cl.
*H04B 1/38* (2006.01)
*H04M 1/00* (2006.01)

(52) U.S. Cl. .................. 455/563; 455/344; 455/566; 455/569.1; 704/246

(58) Field of Classification Search ............ 455/344, 455/563, 566, 569.1; 704/246
See application file for complete search history.

(56) References Cited

U.S. PATENT DOCUMENTS

| | | | |
|---|---|---|---|
| 5,299,261 A | | 3/1994 | Bogart et al. |
| 6,081,782 A | * | 6/2000 | Rabin ..................... 704/275 |
| 6,289,226 B1 | * | 9/2001 | Lekven et al. ............ 455/556 |
| 2002/0178003 A1 | * | 11/2002 | Gehrke et al. ............ 704/246 |
| 2003/0064748 A1 | * | 4/2003 | Stulberger ................ 455/556 |
| 2003/0139171 A1 | * | 7/2003 | Kuita ..................... 455/411 |

FOREIGN PATENT DOCUMENTS

| | | |
|---|---|---|
| JP | 01-251940 A | 10/1989 |
| JP | 10-190810 A | 7/1998 |
| JP | 10-308818 A | 11/1998 |
| JP | 2000-156729 A | 6/2000 |
| JP | 2001-308970   * | 2/2001 |
| JP | 2001-197166 A | 7/2001 |
| JP | 2001-308970 A | 11/2001 |
| JP | 2002-73081 A | 3/2002 |
| JP | 2002-101203 A | 4/2002 |
| JP | 2002-166788 A | 6/2002 |
| JP | 2002-540731 A | 11/2002 |
| JP | 2003-125068 A | 4/2003 |
| JP | 2003-198713 A | 11/2003 |

* cited by examiner

*Primary Examiner*—Nay A Maung
*Assistant Examiner*—Tuan H Nguyen
(74) *Attorney, Agent, or Firm*—Plumsea Law Group, LLC; Mark E. Duell (57) ABSTRACT

A system and method for formatting numbers is disclosed. The system and method can determine if a telephone number is received, either alone or as part of a string. If a telephone number is received, the system applies a format to the number corresponding to a recognized telephone number format. If a number other than a telephone number is received, the system applies a different kind of format to the number. In some cases, the system applies a format to the number using the pauses between spoken characters or numbers. The system and method can be used with a hands free telephone.

17 Claims, 10 Drawing Sheets

FIG.7 three three se-ven    six four five    one two three four

FIG.9 three three se-ven six four five one two three four

FIG.11 three three se-ven six   four    five   one   two three four

| 3376 | | 451 | | 234 | | PAUSE PAUSE STAR | | 9999 |

FIG.14 three three se-ven six    four five one    two three four    pause pause star    nine nine nine    nine

| 5413 | | 3077 | | 6954 | | 0359 |

FIG.17 five four one three    three ze-ro se-ven se-ven    six nine five four    ze-ro three five nine

SYSTEM AND METHOD FOR FORMATTING AND DISPLAYING NUMBERS

BACKGROUND

1. Field of the Invention

This invention relates to a system and method for formatting and displaying numbers, and more particularly, to a system and method for formatting and displaying numbers for use with a hands free telephone in an automobile.

2. Related Art

There are existing systems where a dialed number is parsed and displayed in a designated format. One example of such a system is Lekven et al., U.S. Pat. No. 6,289,226. Another example is Bogart et al., U.S. Pat. No. 5,299,261.

However, these systems are designed to format only telephone numbers and are limited in their ability to format other types of numbers.

In addition, neither of these systems or methods provides a system where voice information, as opposed to dialed or typed digits, is received and formatted. With the increasing use of mobile telephones, especially in motor vehicles, hands free operation of a mobile telephone is becoming increasingly important. In some states, it is illegal to operate a mobile telephone unless a hands free system is used.

There is currently a need for a system that can receive spoken or dictated information and properly format the information without requiring additional instructions or commands. In other words, there is a need for a system that is truly hands free and can function properly without requiring additional manually typed commands.

SUMMARY

A system and method for formatting and displaying numbers are disclosed. The invention can be used with a hands free telephone or communication system in a motor vehicle. The term "motor vehicle" as used throughout the specification and claims refers to any moving vehicle that is capable of carrying one or more human occupants and is powered by any form of energy. The term motor vehicle includes, but is not limited to cars, trucks, vans, minivans, SUV's, motorcycles, scooters, boats, personal watercraft, and aircraft.

The system and method can determine if a telephone number is received, either alone or as part of a string. If a telephone number is received, the system applies a format to the number corresponding to a recognized telephone number format. If a number other than a telephone number is received, the system applies a different kind of format to the number. In some cases, the system applies a format to the number using the pauses between spoken characters or numbers.

In one aspect, the invention provides a central unit comprising a microphone port adapted to receive information from a microphone, a display port adapted to interact with a display device, where the central unit receives microphone information from the microphone port and determines if the information includes numbers or words. If numbers are received, the central unit determines if the numbers include a telephone number or a non-telephone number. If a telephone number is received, the central unit formats the telephone number using a predetermined telephone number format including at least one separation character.

In another aspect, a second format is used to format a non-telephone number.

In another aspect, the central unit detects at least one pause in the microphone information.

In another aspect, the central unit inserts a separator character in a location corresponding to the pause.

In another aspect, the pause is determined if a period of relative silence equals or exceeds a preset duration.

In another aspect, the pause determination criteria can be adjusted by adjusting a period of relative silence.

In another aspect, the microphone information includes groups of numbers and pauses separating the groups of numbers. The central unit converts the microphone information into a string of machine readable characters, and the central unit places a separation character in a location corresponding to a pause.

In another aspect, the telephone number is formatted using a predetermined telephone number format and any pause is disregarded.

In another aspect, a second format is used to format a non-telephone number and the formatted number is sent to the display port.

In another aspect, the invention includes a motor vehicle with a chassis, at least one wheel adapted to contact a driving surface, a steering wheel, an engine, and a hands free telephone system. The hands free telephone system includes a central unit comprising a microphone port adapted to receive information from a microphone, a display port adapted to interact with a display device, where the central unit receives microphone information from the microphone port and determines if the information includes numbers or words. If numbers are received, the central unit determines if the numbers include a telephone number or a non-telephone number. If a telephone number is received, the central unit formats the telephone number using a predetermined telephone number format including at least one separation character.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION OF THE PREFERRED EMBODIMENT(S)

Figure 1:
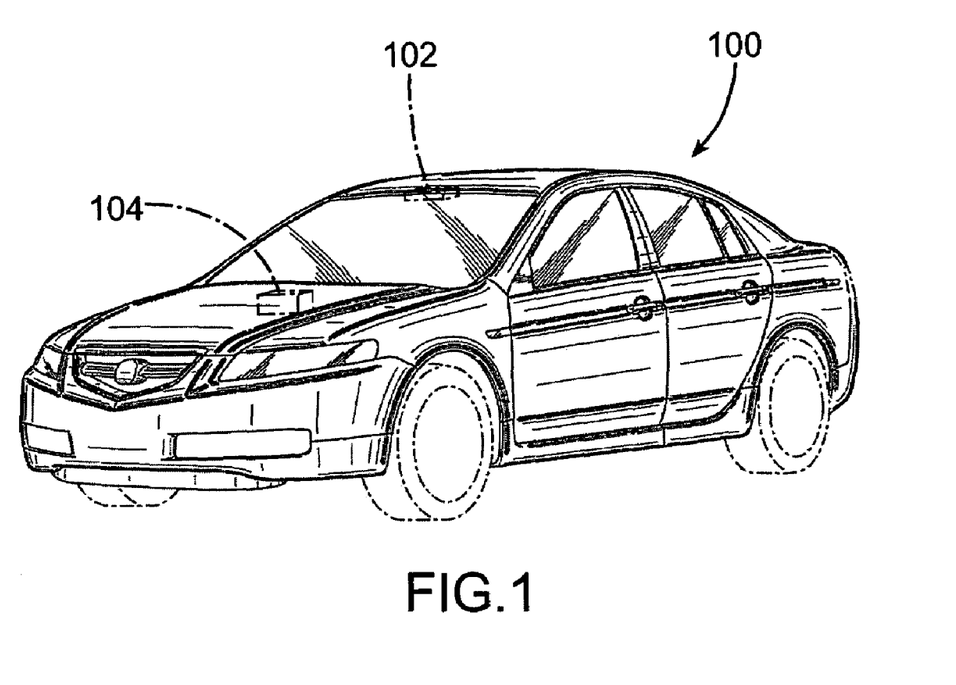
FIG. 1 is a schematic diagram of a preferred embodiment of a vehicle in association with a communication system in accordance with the present invention.
Figure 2:
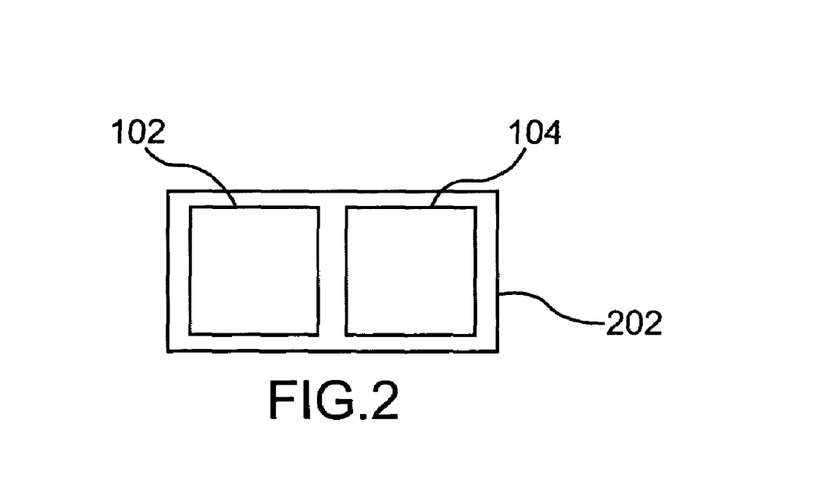
FIG. 2 is a schematic diagram of a preferred embodiment of a communication system and a navigation system in accordance with the present invention.

FIG. 1 is a schematic view of an illustrative embodiment of a motor vehicle 100. Motor vehicle 100 includes a communications system 102 and an optional navigation system 104. Communications system 102 can be a device that assists in providing communications services to motor vehicle 100. In some cases, communications system 102 includes a wireless telephone. In some cases, communications system 102 includes a cellular telephone. In the embodiment shown in FIG. 1, communications system 102 and navigation system 104 are shown schematically as two separate devices. However, in some embodiments, communication system 102 and navigation system 104 are combined into a single device 202, as shown in FIG. 2.

Figure 3:
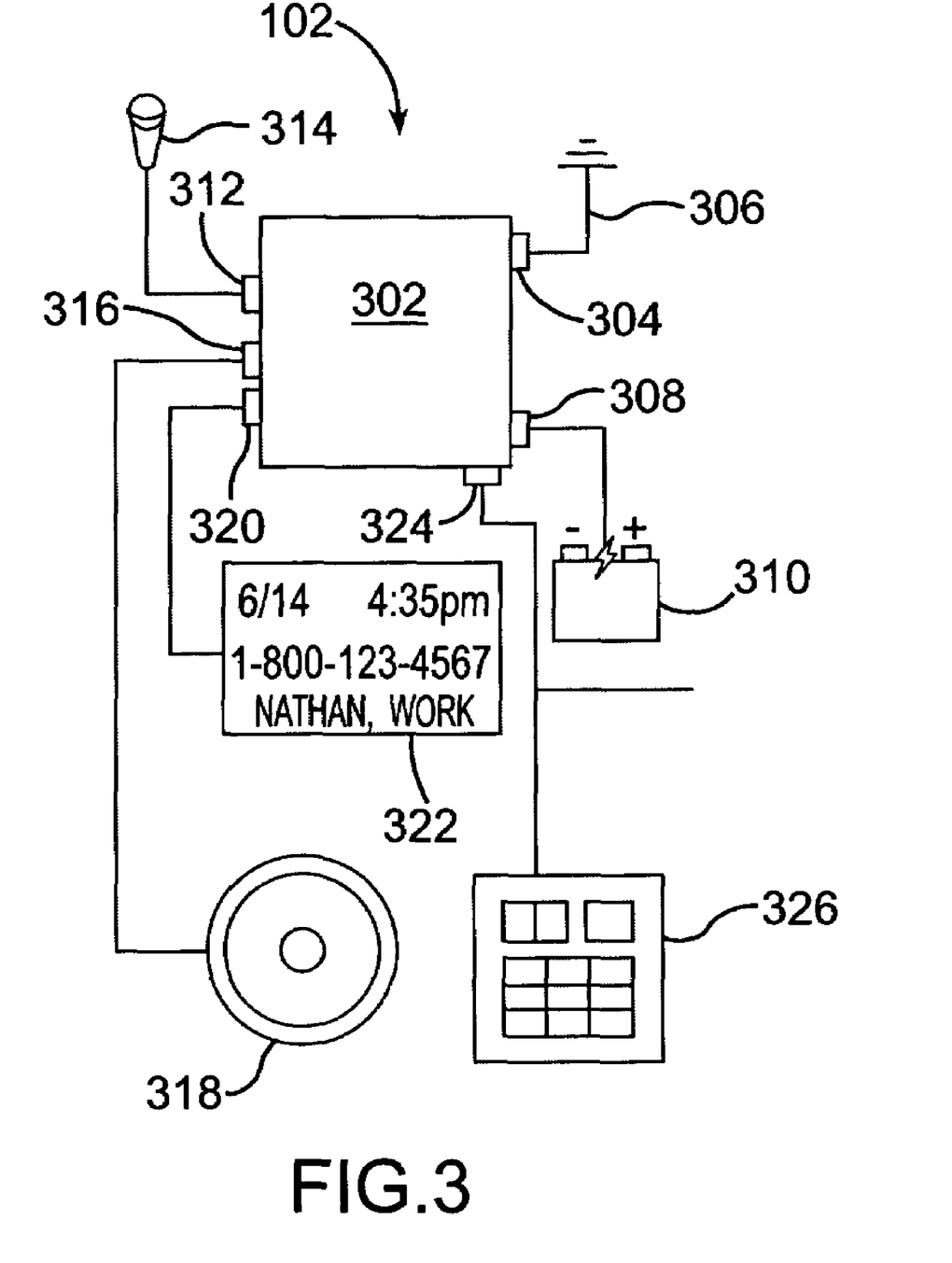
FIG. 3 is a schematic diagram of a preferred embodiment of a communication system in accordance with the present invention.

Preferably, communications system 102 includes a number of components. Referring to FIG. 3, which shows a schematic diagram of a preferred embodiment of a communications system 102, communications system 102 includes a central unit 302. Central unit 302 preferably includes a number of inputs and outputs. Central unit 302 includes an antenna port 304 that is designed to receive information from an antenna 306, and a power port 308 that can connect central unit 302 to a power supply 310. In the embodiment shown in FIG. 3, power supply 310 is a battery.

Central unit 302 can also include a number of items that facilitate human interaction. To receive vocal information from a user, central unit 302 includes a microphone port 312 that is capable of communicating with a microphone 314. Central unit 302 also includes an audio port 316 that is designed to send audio information to one or more speakers or audio devices. In some embodiments, microphone port 312 and audio port 316 are conductors of a single physical connector. For example, microphone port 312 and audio port 316 can be female conductors of a multi-channel coaxial plug, like the standard 2.5 mm headset plug. In order to provide visual information to a user, central unit 302 can include a display port 320 that is capable of interacting with a display device 322.

In some embodiments, all or most of the items shown in FIG. 3 are housed in a single case or unit. A typical cellular telephone handset is an example of a device that would include all of the elements of FIG. 3 in a single case or housing. In other embodiments, the various items shown in FIG. 3 are not housed in a single physical case, but instead, are distributed throughout a motor vehicle and communicate with one another via known wired or wireless methods. For example, in a system where one or more items communicate wirelessly, the Bluetooth® protocol can be used.

In one embodiment, communications system 102 is designed to be a hands free system in a motor vehicle. Microphone 314 is placed in a discreet and somewhat hidden location in the passenger compartment of motor vehicle 100 and audio port 316 is placed in communication with the audio system of motor vehicle 100. Display device 322 is also disposed in the passenger compartment, and the other components of communications system 102 are preferably placed out of plain sight.

Figure 4:
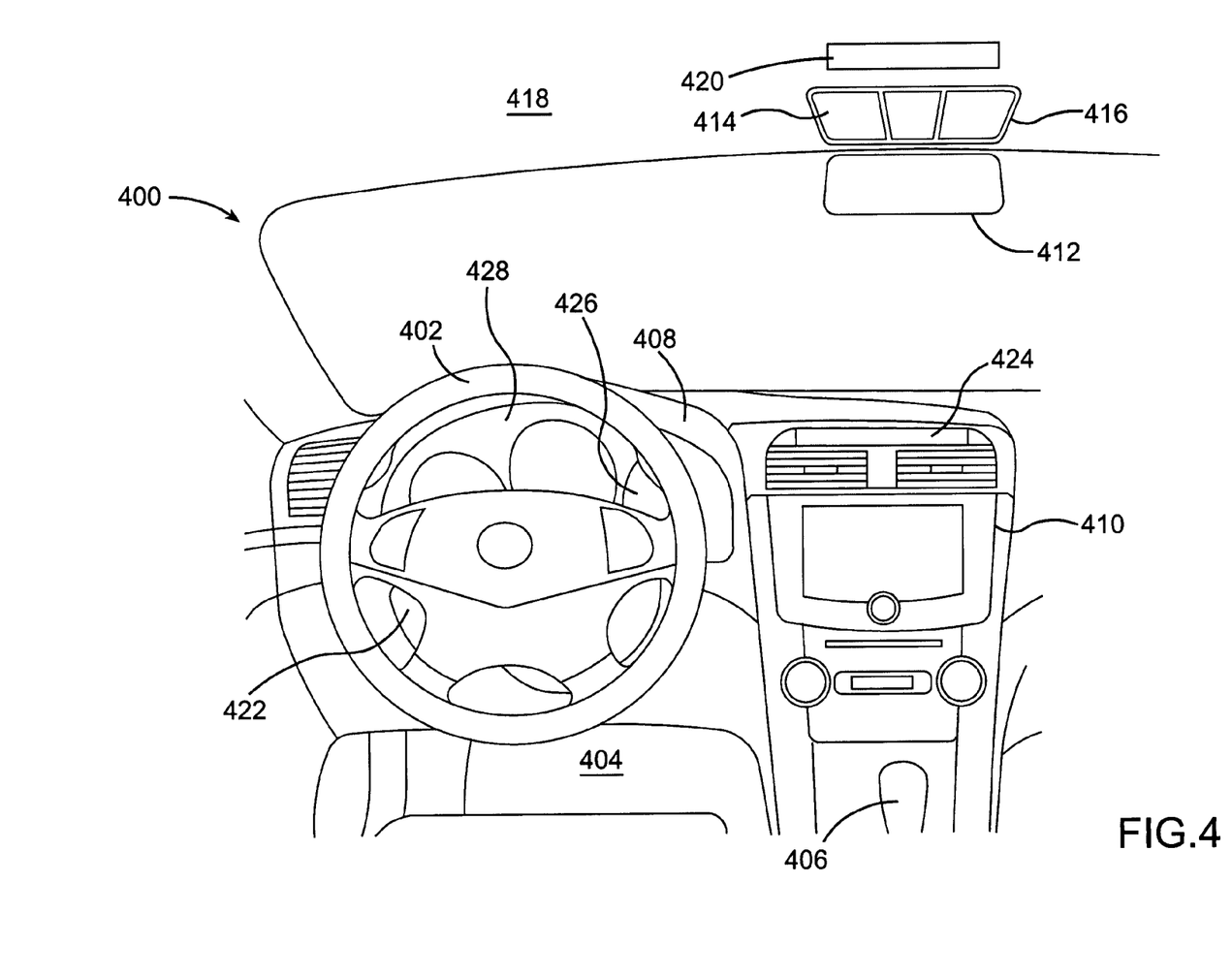
FIG. 4 is a schematic view of the interior of the vehicle shown in FIG. 1.

FIG. 4 shows a preferred embodiment of an interior 400 of motor vehicle 100 (see FIG. 1). Interior 400 includes a steering wheel 402, a driver's seat 404, a shifter or gear selector 406, a dashboard 408, a center console 410 and a rear view mirror 412. Preferably, interior 400 includes a Hands Free Telephone (HFT) unit 416 mounted in a headliner 418. Preferably, HFT unit 416 includes a microphone 414. In some embodiments, microphone 414 is also used with a navigation system.

Preferably, an HFT control unit 420 is mounted above headliner 418 so that it is out of plain sight. In some embodiments, HFT controls 422 are mounted onto steering wheel 402. Preferably, an HFT display unit 424 is disposed in center console 410. In addition, some embodiments include a multi-function display 426 disposed on dashboard 408. Multi-function display 426 can also show HFT information and status. In some embodiments, multi-function display 426 is disposed within instrument cluster 428 on dashboard 408. The arrangement of the various components of the HFT system in the embodiment shown in FIG. 4 is intended to be ergonomically correct, and provide the user with an intuitive and easy to use HFT.

Figure 5:
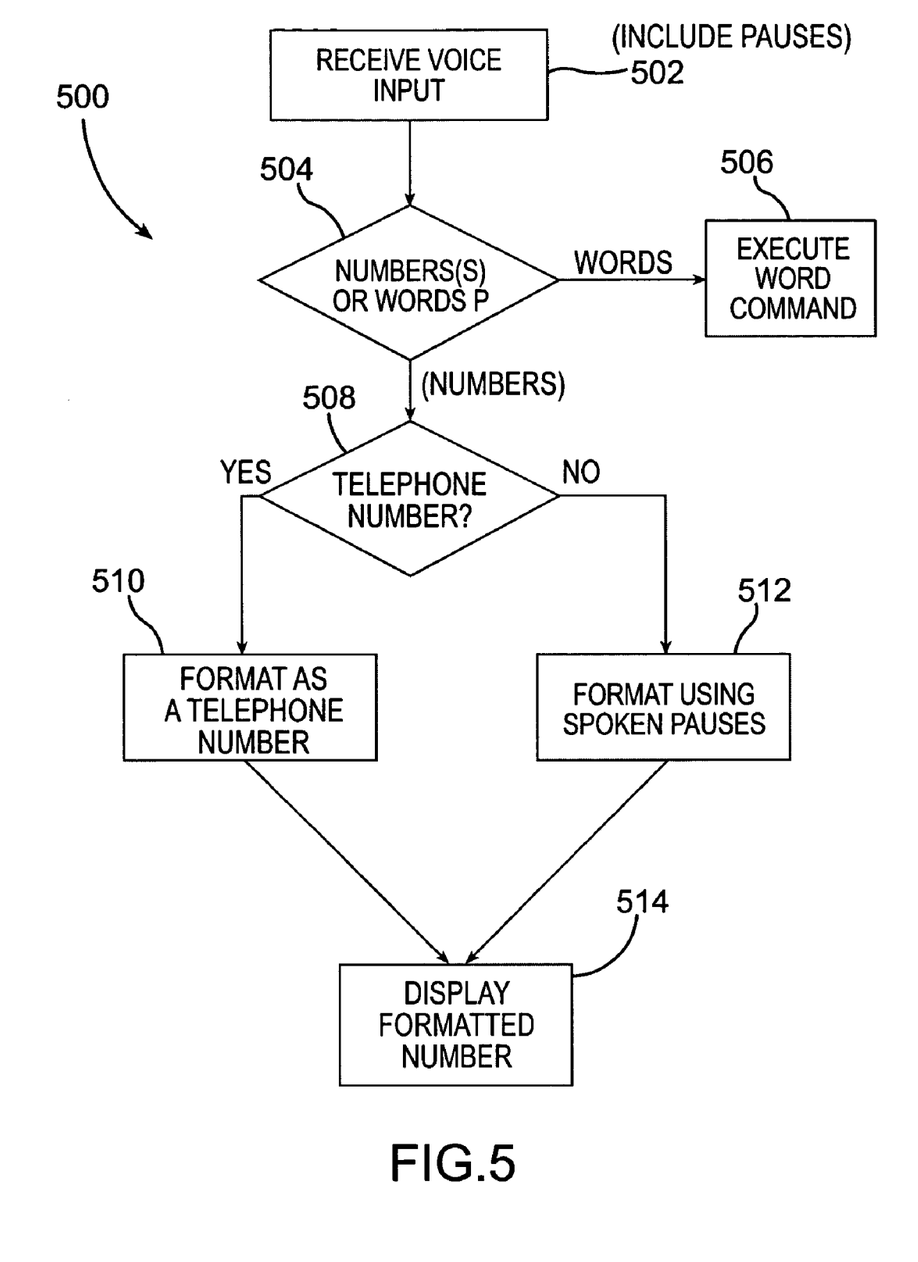
FIG. 5 is a flow diagram of a preferred embodiment of a method for formatting numbers in accordance with the present invention.

Embodiments of the present invention include a system and method for formatting and displaying numbers. FIG. 5 is flow diagram of a preferred embodiment of a method 500 for formatting and displaying numbers. The process begins when a voice input is received 502. Any known speech recognition process or program can be utilized to convert spoken words, phrases and/or numbers into a machine readable format. Preferably, the IBM embedded Via Voice speech recognition engine is used. Preferably, the pauses that occur while speaking are preserved.

In step 504, a decision is made. Here, the process determines if numbers or words are spoken. If words are spoken, then the process moves to step 506, and the spoken word commands are executed. If numbers are spoken, then the process proceeds to step 508 where another decision is made. The numbers that are spoken can be referred to as the spoken number string.

In step 508, the process determines if a telephone number or a different kind of number has been received. The steps that are used to make this decision are discussed below. If process 500 determines that a telephone number has been received, then the process formats the telephone number in a way suitable for a telephone number in step 510. If the process determines that a different kind of number has been received, then the process formats the number in a particular way, as disclosed below, in step 512. After the number has been formatted and/or prepared for display, the process then sends information to a display device and eventually, the formatted number is displayed in step 514.

Figure 6:
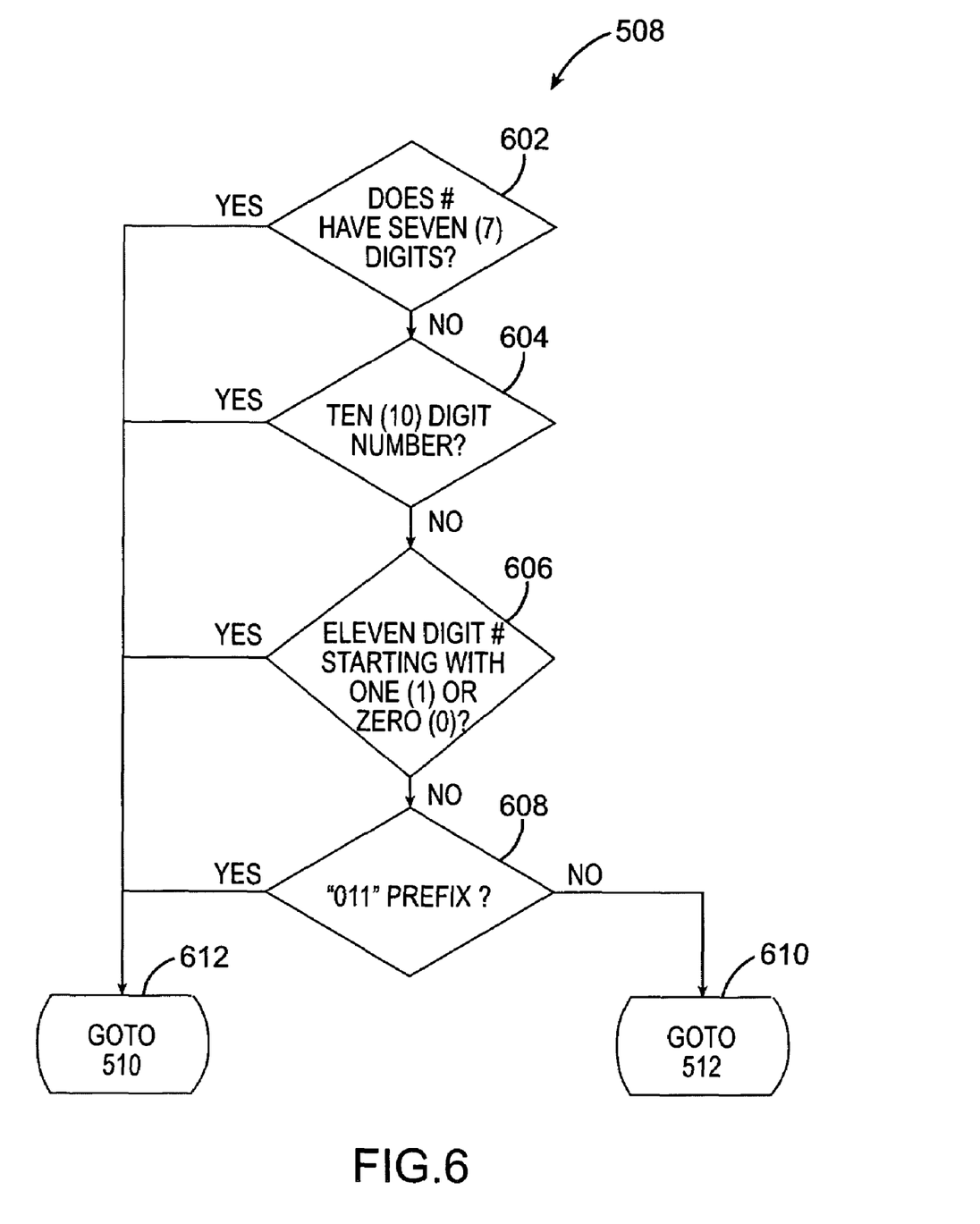
FIG. 6 is a flow diagram of a preferred embodiment of a method for determining if a number is a telephone number in accordance with the present invention.

FIG. 6 is a flow diagram of a preferred embodiment of step 508. As shown in FIG. 6, several steps are preferably used to determine if a telephone number has been received. Referring to FIGS. 5 and 6, in step 602, the process determines if a seven digit number has been received. If a seven (7) digit number is received, then the process determines that a telephone number has been received and the process moves to step 612. Step 612 returns the process to step 510, where a telephone number is properly formatted. If a seven digit number has not been received, then the process moves to step 604.

In step 604, the process determines if a ten (10) digit number has been received. If a ten digit number has been received, the process assumes a telephone number has been received and the process moves to step 612. If a ten digit number has not been received, then the process moves to step 606.

In step 606, the process determines if an eleven (11) digit number starting with a one (1) or zero (0) has been received. If an eleven digit number has been received, the process assumes a telephone number has been received and the process moves to step 612. If an eleven digit number has not been received, then the process moves to step 608.

In step 608, the process determines if a predetermined dialing prefix, for example, zero-one-one (011) has been received. This is the current international dialing prefix for the United States. Of course, other dialing prefixes can also be used for other countries or a different dialing prefix can be used if the international dialing prefix for the United States changes. Preferably, in this step, the process does not use the length of spoken number string to determine if a telephone number has been received, but in other embodiments, it is possible to use the prefix and/or the length of the spoken number string to determine if a telephone number has been received. In step 608, if the predetermined prefix is received, then the process assumes that a telephone number has been received and the process moves to step 612. If the predetermined prefix is not received, then the process moves to step 610. Step 610 returns the process to step 512, where a non-telephone number is formatted.

The formatting steps 510 and 512, generally attempt to format the number in a suitable and easy to read way. In many cases, the goal is to format the number in way that would be familiar to a user reading the displayed number.

So, in step 510, where a telephone number is formatted, most users are accustomed to reading telephone numbers with separators between certain segments of the number. For example, in a seven digit telephone number, users would be accustomed to seeing the number displayed as: XXX-XXXX. For ten digit numbers, users would be used to seeing the number as: XXX-XXX-XXXX and for eleven digit numbers, users would normally see: X-XXX-XXX-XXXX. Numbers with an international dialing prefix would normally be displayed as: 011-XX-X-XXX-XXXX. Preferably, a separator character is used to divide the number string into appropriate groups. A separator character is defined as a character or symbol used to divide a number string. Examples of a separator character include: a dash (-), an underline (_), a period (.), and a space ( ). These or other characters or symbols can be used as a separator character. Preferably, a space ( ) is used as the separator character, but any character or symbol can also be used.

FIGS. 7-22 show various examples of how process 500 (see FIG. 5) analyzes or manages different spoken number strings.

FIGS. 7-13 show an example of a ten digit number string. Because the number string shown in FIGS. 7-13 includes ten digits, step 604 (see FIG. 6) will consider this number string to be a telephone number, and this number will be formatted as a telephone number regardless of how the number is dictated or spoken by a user.

Figure 7:
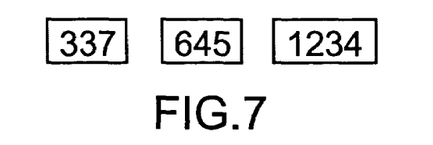
FIG. 7 is a schematic representation of a spoken number.
Figure 8:
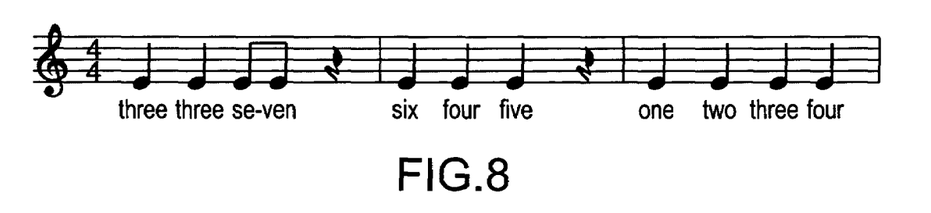
FIG. 8 is a musical representation of a spoken number.

FIG. 7 is a schematic diagram of a dictated number. FIG. 8 is a musical notation representation of the same number and dictation as FIG. 7. Both FIGS. 7 and 8, are used to represent a certain way a user dictates the number, 337-645-1234. In FIG. 7, the boxes are used to represent groups of numbers that are spoken together. So, in FIG. 7, the first three numbers, 337, are dictated as a group, and then there is a pause, and then the second group of numbers, 645, are dictated as a group, and then there is a pause, and finally, the last group of numbers, 1234, are dictated as a group. FIG. 8 expresses this dictation pattern in musical notation.

Figure 9:
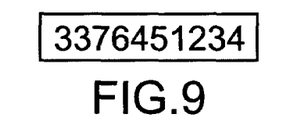
FIG. 9 is a schematic representation of a spoken number.
Figure 10:
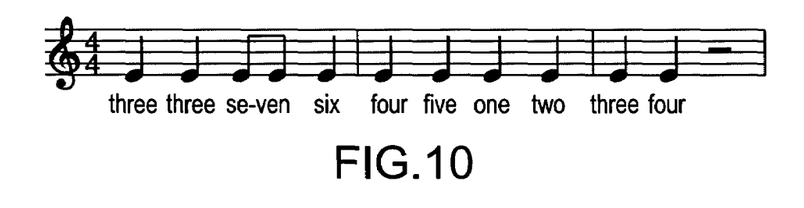
FIG. 10 is a musical representation of a spoken number.

FIGS. 9 and 10 show a second example of a user dictating the same ten digits. However, in this example, the user dictates all ten digits as a single group without any pauses between any of the dictated numbers.

Figure 11:
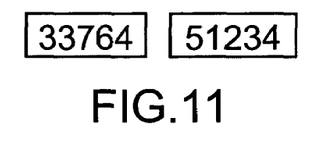
FIG. 11 is a schematic representation of a spoken number.
Figure 12:
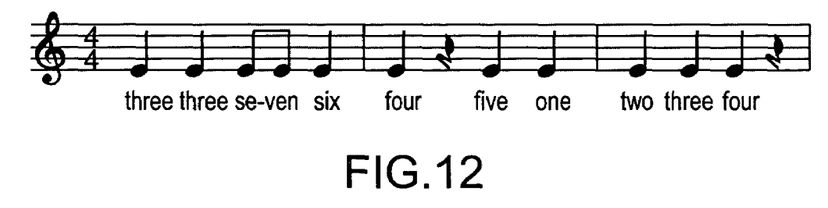
FIG. 12 is a musical representation of a spoken number.

FIGS. 11 and 12 show a third example of a user dictating the same ten digits as the first example (shown in FIGS. 7 and 8), and the second example (shown in FIGS. 9 and 10). In this third example, the user dictates the first five digits as a group, pauses, and then dictates the last five digits as a group.

In the three examples shown in FIGS. 7-12, the same ten numbers are dictated, but there is a difference in the way the number is dictated. In each of three examples, the user pauses, if at all, during different times while dictating or speaking the numbers.

The following description provides the preferred way the three examples of speech are processed. Referring to FIG. 5, the process will recognize that numbers are being received in step 504. The process will then proceed to step 508 where the process determines if the spoken number string is a telephone number. Referring to FIG. 6, because all of the examples shown in FIGS. 7-12 include ten spoken digits, the process will assume that a telephone number has been received in step 604. The process will then proceed to step 510, where a telephone number is formatted and prepared for display.

Preferably, in step 510, the ten digit telephone number will be formatted as: XXX-XXX-XXXX. In other words, a first group of three numbers is displayed together, then a spacing character is inserted. This first group is followed by a second group of three numbers and a spacing character following that second group. Finally, a third set of four numbers is grouped. This produces a conventional telephone number format where the three digit area code is grouped and separated from the seven digit local number. The seven digit local number is also separated and grouped as a three digit exchange and a four digit number.

Figure 13:
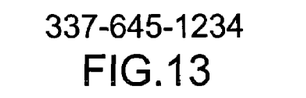
FIG. 13 is a schematic diagram of a preferred embodiment of a format for a displayed number in accordance with the present invention.

The three examples shown in FIGS. 7-12 demonstrate a feature where, regardless of how the number is spoken and where, if any, pauses are inserted during the dictation of a telephone number, the system preferably formats the number as a telephone number as shown in FIG. 13. In other words, if the process determines if a telephone number has been received, then the process formats the number as a telephone number regardless of how the number is dictated, how many pauses are interspersed with the number.

Figure 14:
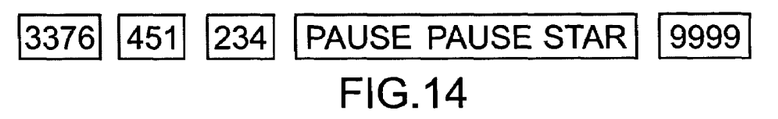
FIG. 14 is a schematic representation of a spoken number.
Figure 15:
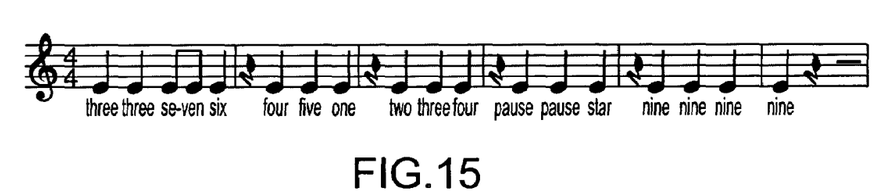
FIG. 15 is a musical representation of a spoken number.
Figure 16:
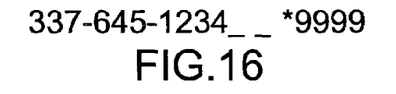
FIG. 16 is a schematic diagram of a preferred embodiment of a format for a displayed number in accordance with the present invention.

FIGS. 14 to 16 are used to demonstrate another feature of the present invention. FIGS. 14 and 15 are schematic and musical notation expressions of a dictated number and word string. In this example, a ten digit number is followed by the words, "pause pause star" and the phrase, "nine nine nine nine". This dictated string of numbers and letters is shown schematically in FIG. 14 and using musical notation in FIG. 15.

In one embodiment, the process can determine if a particular number and word string is a telephone number followed by commands. In this embodiment, the process applies the tests or decisions of FIG. 6 up to the point where the word "pause" is received. In the example shown in FIGS. 14 and 15, the process would apply the tests described in connection with FIG. 6 to the string of characters proceeding the word, "pause." Since the number 3375551234 is received before the word "pause," the process would apply the tests described in connection with FIG. 6 to that number string. Because that number string includes 10 characters, the process preferably determines that a telephone number has been received, along with a command following the number.

Preferably, because the process has determined that a telephone number along with a command has been received, the process formats the digits received prior to the word, "pause" as a telephone number using the same rules described above.

In the example shown in FIGS. 14 and 15, the process would preferably format the string as a telephone number, followed by a pair of characters to represent the two pause commands, followed by 9999. Preferably, the process formats the number in a manner similar to FIG. 16.

This formatting can be helpful when a user would like to store or display a string that corresponds to a call center account or an Interactive Voice Response (IVR) system. One example of this would be a voice mail system where the access telephone number is stored or displayed, followed by the user's Personal Identification Number (PIN) or password.

Figure 17:
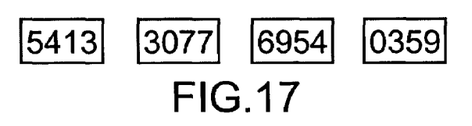
FIG. 17 is a schematic representation of a spoken number.
Figure 18:
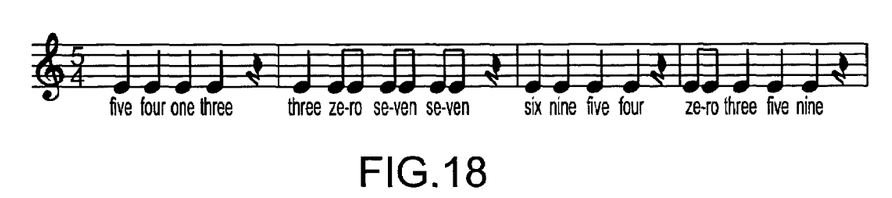
FIG. 18 is a musical representation of a spoken number.

FIGS. 17 and 18 show, in two different ways, another dictated number string. In this example, four groups of four digits are received by the system, and each of the four groups are separated by pauses or breaks. This is shown schematically in FIG. 17 and using musical notation in FIG. 18.

Preferably, after this number string is dictated, the system analyzes the number to see if the number is a telephone number. Returning to FIG. 6, the system would conclude that this number string is not a telephone number because none of the tests or criteria of steps 602 to 608 were met. Since none of the criteria are met, this number would be formatted according to step 512, where numbers other than telephone numbers are formatted.

Figure 19:
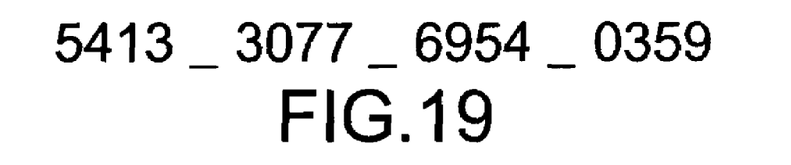
FIG. 19 is a schematic diagram of a preferred embodiment of a format for a displayed number in accordance with the present invention.

Preferably, in step 512, non-telephone numbers are formatted using the pauses that are dictated. In the example shown in FIGS. 17 and 18, that number string is preferably formatted using the embedded pauses, and the number is preferably formatted as shown in FIG. 19. The formatted number of FIG. 19 includes a separation character between number groups where a pause was received.

Figure 20:
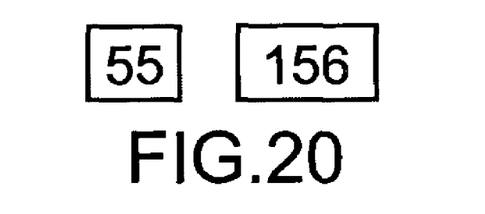
FIG. 20 is a schematic representation of a spoken number.
Figure 21:
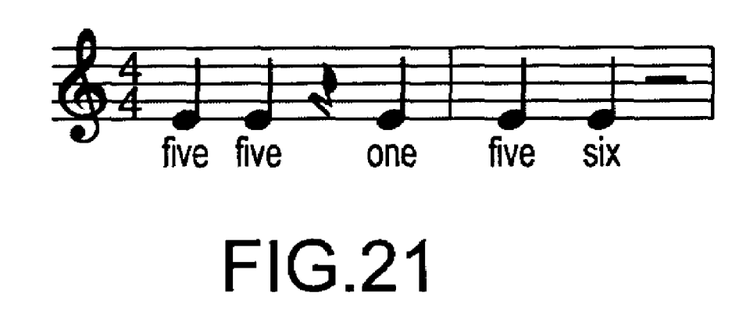
FIG. 21 is a musical representation of a spoken number.

FIGS. 20 and 21 show another example of a dictated string of numbers. FIG. 20 shows the dictated number string schematically and FIG. 21 shows the dictated number string in musical notation.

Similar to the previous example, the system would analyze this number string to determine if the number string met the criteria for a telephone number, as described in connection with FIG. 6. Since this number would fail to meet any of those criteria or tests, this number would be formatted in accordance with step 512 (see FIGS. 5 and 6).

Preferably, in step 512, numbers that are not telephone numbers are formatted using the spoken or dictated pauses. In the case shown in FIGS. 20 and 21, the user pauses between saying "55" and "156" and thus, the system receives a pause between "55" and 156."

Figure 22:
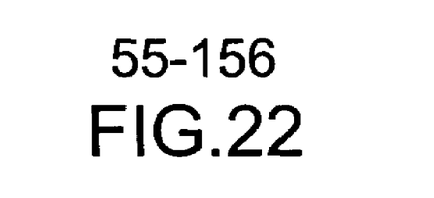
FIG. 22 is a schematic diagram of a preferred embodiment of a format for a displayed number in accordance with the present invention.

Because this number string is formatted using the spoken pauses, preferably, the system formats the number with a separator character placed between 55 and 156 as shown in FIG. 22.

Figure 23:
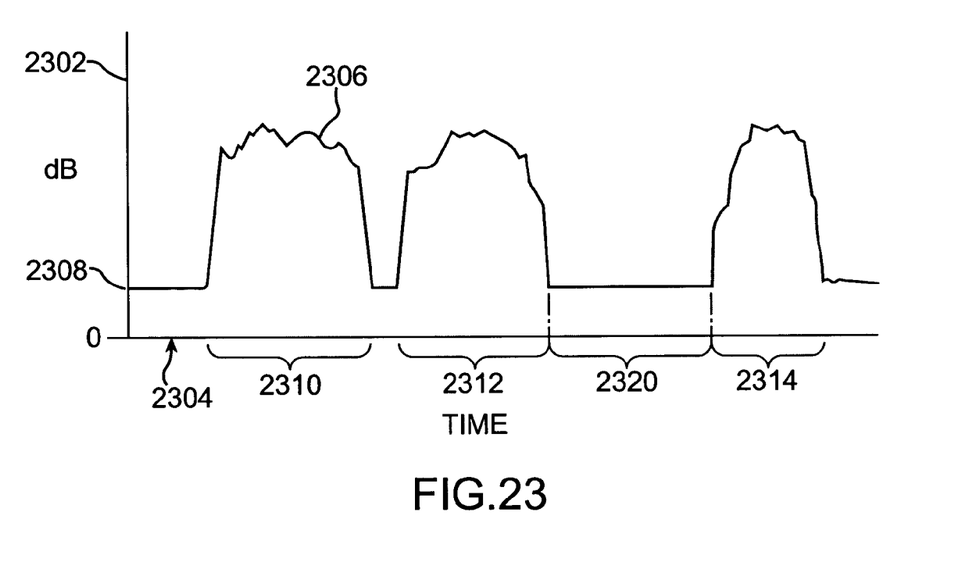
FIG. 23 is a graph of an example of microphone information.

FIG. 23 is a graph showing an example of microphone information. The vertical axis 2302 is decibels and the horizontal axis 2304 is time. Microphone information 2306 varies in response to input received from microphone port 312 (see FIG. 3). In some cases, background noise exists and microphone information 2306 is rarely, if ever, completely silent at 0 dB. In most cases, background noise produces a noise floor 2308. This is defined as relative silence when compared with voice input.

FIG. 23 shows three voice inputs, a first voice input 2310, a second voice input 2312 and a third voice input 2314. The second voice input 2312 is separated from third voice input 2314 by a period of relative silence 2320. Preferably, this period of relative silence 2320 is compared with a preset or predetermined pause time period. If the period of relative silence 2320 equals or exceeds the preset pause time period, then the system determines that a pause exists between second voice input 2312 and third voice input 2314. This preset pause time period can be predetermined or can be adjustable by the user.

Figure 24:
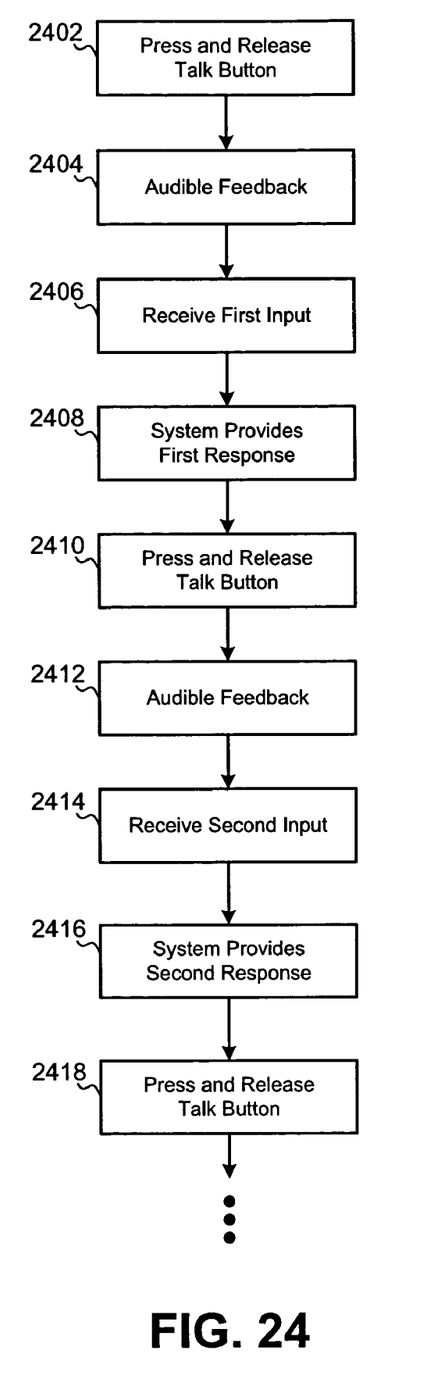
FIG. 24 is a flow diagram of a preferred embodiment of a method for formatting numbers in accordance with the present invention.

FIG. 24 is a flow diagram of another preferred embodiment of a method for formatting numbers. In this embodiment, information related to a talk button is used to determine the location of spacing characters.

In this embodiment, the system detects pauses after the user dictates a particular string. The system also detects information from the talk button, that is, when the talk button is pressed. The system can use either or both of these events to determine the location of the separation character in the string.

Referring to FIG. 24, the method begins with step 2402 where a user presses and releases a talk button. In step 2404, the system provides some type of feedback. In a preferred embodiment, audible feedback in the form of a beep is preferred. This informs the user that the system is ready to receive input.

In step 2406, the user speaks and the system receives a first input. For purposes of example only, consider an example where the first input is, "one two three." Here, the system waits for a predetermined pause period to assume that the user has finished dictating the first portion of the string. After the predetermined pause period has elapsed, the system assumes that the user is finished with the first portion of the string and begins to process the string. As discussed above, the pause period can be pre-set or selected by the user. In a preferred embodiment, the pause period is between 0.1 seconds and 3 seconds. In an exemplary embodiment, the pause period is about 1.0 to 1.5 seconds.

After the pause period has elapsed, the first input is processed, and in step 2408, the system provides additional feedback. In step 2408, the system preferably, talks back the information that was just received. In this example, the system would say back to the user, "one two three." The system can also provide a visual feedback by displaying "123" on an associated display. The system can provide one or both forms of feedback. This is used to inform the user that information has been received and informs the user of what that information was. This permits the user to confirm the accuracy of the information and allows to user to know that the information was recorded properly.

In some embodiments, users are able to immediately press the talk button to skip this talk back and confirmation step.

If the information is accurate, the user can provide additional information if desired. In some cases, where there is no separation character in the string, the session ends after step 2408. However, if additional information is needed to complete the string, the user continues on to step 2410.

In this step, the user presses and releases the talk button a second time. The system provides feedback, preferably audible feedback, in step 2412 to inform the user that the system is ready to receive a second input. In some embodiments, they system uses the pressing and/or releasing of the talk button to determine the location of a separation character. Preferably, the system determines the locations of the separation characters "on the fly" as the string is being input, as opposed to waiting until the entire string is received and then inserting separation characters.

In step 2414, the user speaks and provides a second input and that second input is received by the system. In this example, the second input is, "four five six." After the pause period, the system provides a second response in step 2416. Similar to step 2408 above, the system can talk back the recorded information in step 2416 and the system can also display information, so that the user can confirm the accuracy of the second recorded string. In this example, the system would talk back: "four five six" and the system would display "123-456". Again, the system can provide one or both forms of feedback. The separation character inserted between the three and the four was determined by either the pause period or the second press and/or release of the talk button.

If this second recorded string is accurate, and there are no more portions of this string, then the process ends here. However, if additional portions of the string are required, then the user can continue onto step 2418 and the same routine as disclosed above is continued until all of the portions of the string have been successfully recorded.

In the example, the string includes two portions, a first portion being "one two three" and a second portion of "four five six." As disclosed above, the system could use either or both the pause event or the talk button actuation event to detect the location of a separation character. In one embodiment, the system uses the pause events to determine the location of the separation character or characters. In the example disclosed above, since there was a pause after the first portion of the string, the system would place a separation character after 123. So the formatted string would be: 123-456.

In an alternative embodiment, where the system detects talk button actuation events, since there was a talk button press and release event after the first portion of the string, the system would place a separation character between the first and second portions of the string so the formatted string would be: 123-456.

In some embodiments, the system talks back the entire string after it has been completely entered. Preferably, the system pauses during talk back when it encounters a separation character. For example, in the example disclosed above, the system would talk back: "one two three," pause "four five six." This paused talk back feature can be used in other embodiments as well.

In some embodiments, the system would use both the pause and the talk button actuation events, and the same formatted string would result.

Obviously, if additional string portions are dictated and the same routine is followed, the string would include additional portions separated by a separation character. A two segment string was used only for purposes of clarity and illustration and example. The invention is obviously not limited to a two segment string.

While various embodiments of the invention have been described, it will be apparent to those of ordinary skill in the art that may more embodiments and implementations are possible that are within the scope of the invention. Accordingly, the invention is not to be restricted except in light of the attached claims and their equivalents.

What is claimed is:

1. A central unit for formatting and preparing numbers for display comprising: a microphone port adapted to receive spoken voice information from a microphone; a display port adapted to interact with a display device; wherein the central unit receives spoken voice information from the microphone port and determines if the spoken voice information includes numbers;
   if numbers are received, determines if the numbers include a telephone number or a non-telephone number;
   if a telephone number is received, prepares the telephone number for display using a predetermined telephone number format including at least one separation character;
   wherein if the numbers include a non-telephone number, prepares the non-telephone number for display using a predetermined non-telephone number format including at least one separation character, the predetermined non-telephone number format is different from the predetermined telephone number format; and the spoken voice information includes groups of numbers and at least one word command if the spoken voice information is a telephone number, wherein the at least one word command assists in preparing the telephone number for display by indicating the location of the at least one separation character, and wherein the spoken voice information includes groups of numbers and pauses separating the groups of numbers, and wherein the central unit converts the spoken voice information into a string of machine readable characters, and wherein the central unit places a separation character in a location corresponding to a pause.

2. The central unit according to claim 1, wherein the separation character is selected from the group consisting of a dash, an underline, a period, and a space.

3. The central unit according to claim 1, wherein the central unit detects an actuation of a talk button and uses the actuation to insert a separation character.

4. The central unit according to claim 1, wherein the central unit detects at least one pause in the spoken voice information.

5. The central unit according to claim 4, wherein the central unit inserts a separator character in a location corresponding to the pause.

6. The central unit according to claim 4, wherein the pause is determined if a period of relative silence equals or exceeds a preset duration or if the word command indicates the pause.

7. The central unit according to claim 1, wherein the telephone number is prepared for display using a predetermined telephone number format and any pause is disregarded.

8. The central unit according to claim 1, wherein a non-telephone number is prepared for display using a predetermined non-telephone number format including at least one separation character, wherein the location of the at least one separation character is indicated by a word command in the spoken voice information, and wherein the formatted non-telephone number is sent to the display port.

9. A method of formatting and preparing numbers for display comprising the steps of: receiving voice information from a microphone port; determining if the voice information includes words or a number string including a plurality of unformatted digits; determining if the number string includes a telephone number;

if the number string includes a telephone number, then preparing the number string for display by dividing and separating the digits of the number string into at least two groups to produce a formatted telephone number;

if the number string does not include a telephone number, then preparing the number string for display by dividing and separating the digits of the number string into at least two groups to produce a formatted non-telephone number; and     wherein the formatted telephone number is grouped differently than the formatted non-telephone number, and wherein the voice information includes groups of numbers and pauses separating the groups of numbers, and wherein the central unit converts the voice information into a string of machine readable characters, and wherein the central unit places a separation character in a location corresponding to a pause.

10. The method according to claim 9, further comprising the step of receiving information from a talk button and using the information to insert a separation character.

11. The method according to claim 9, further comprising the step of detecting at least one pause in the voice information, wherein the pause indicates the position of a separator character in a selected format.

12. The central unit according to claim 11, wherein the separator character is inserted in a location corresponding to the pause to prepare the number string for display.

13. The method according to claim 9, wherein the telephone number is prepared for display by dividing and separating the digits of the number string using a predetermined telephone number format and any pause in the number string is disregarded.

14. A motor vehicle comprising:

a chassis;

at least one wheel adapted to contact a driving surface;

an interior comprising a steering wheel, a dashboard and a driver's seat;

a hands free telephone (HFT) system comprising a microphone disposed in a headliner, at least one HFT control disposed on the steering wheel, and a display, wherein the HFT system receives a dictated string of voice information, prepares the voice information for display by dividing and separating the voice information into at least two groups and displays the voice information, wherein the HFT system divides and separates a first type of information into a first set of groups and divides and separates a second type of information into a second set of groups, the first set of groups being different from the second set of groups;

wherein the voice information includes a string of numbers and at least one word command, wherein the at least one word command assists in preparing the voice information for display by indicating a point of separation in one of the first set of groups or the second set of groups; and wherein the HFT system uses a pause in the string of voice information for the second set of groups and inserts a separation character in a location corresponding to the pause; and wherein the pause is determined if a period of relative silence equals or exceeds a preset duration or if the word command indicates the pause.

15. The motor vehicle according to claim 14, wherein the first type of information is a telephone number.

16. The motor vehicle according to claim 14, wherein the HFT system is capable of detecting pauses in the string of voice information.

17. The motor vehicle according to claim 14, wherein the HFT system displays formatted information.

\* \* \* \* \*